United States Patent [19]
Lunghofer et al.

[11] Patent Number: 5,713,668
[45] Date of Patent: Feb. 3, 1998

[54] SELF-VERIFYING TEMPERATURE SENSOR

[75] Inventors: James G. Lunghofer, Colorado Springs, Colo.; C. Tom Brannon, Houston, Tex.; Bernard L. Conner; Lee Transier, both of Kingwood, Tex.; Collins P. Cannon, Kearney, Mo.

[73] Assignee: AccuTru International Corporation, Kingwood, Tex.

[21] Appl. No.: 702,373

[22] Filed: Aug. 23, 1996

[51] Int. Cl.$^6$ .................................................. G01K 7/00
[52] U.S. Cl. ........................ 374/179; 374/163; 374/181
[58] Field of Search ................................. 374/163, 178, 374/179, 180, 181, 183, 184, 185

[56] References Cited

U.S. PATENT DOCUMENTS

| | | | |
|---|---|---|---|
| 2,098,650 | 11/1937 | Stein | 374/163 X |
| 2,460,773 | 2/1949 | Stimson | 374/163 X |
| 2,769,340 | 11/1956 | Bernreuter et al. | 374/163 X |
| 3,307,402 | 3/1967 | Richardson | 374/163 X |
| 3,966,500 | 6/1976 | Brixy | 374/163 X |
| 4,133,700 | 1/1979 | Hollander et al. | 374/163 X |
| 4,220,039 | 9/1980 | Taylor | 73/204 X |
| 4,403,296 | 9/1983 | Prosky | 374/181 X |
| 4,624,582 | 11/1986 | Banda et al. | 374/181 |
| 4,795,884 | 1/1989 | Carroll | 374/183 X |
| 4,901,061 | 2/1990 | Twerdochlib | 340/604 |
| 4,934,137 | 6/1990 | MacKay | 60/39.33 |
| 4,971,452 | 11/1990 | Finney | 374/208 |
| 4,977,001 | 12/1990 | Greenspan | 428/34.6 |
| 5,022,263 | 6/1991 | Uriu et al. | 73/295 |
| 5,036,704 | 8/1991 | Pusatcioglu et al. | 73/336.5 |
| 5,038,303 | 8/1991 | Kimura | 364/557 |
| 5,061,083 | 10/1991 | Grimm et al. | 374/112 |

(List continued on next page.)

FOREIGN PATENT DOCUMENTS

| | | | |
|---|---|---|---|
| 0122141 | 9/1979 | Japan | 374/183 |
| 575-704 | 10/1977 | U.S.S.R. | 374/183 |

OTHER PUBLICATIONS

C.P. Cannon, et al., "Dual high temperature measurements using Johnson noise thermometry", 1982.

C.P. Cannon, "Temperature measurements", 1982 American Institute of Physics, pp. 1061–1066.

C. Cannon, et al., "Smart Sensor Application to Nuclear Plant Thermocouple Channels," speech given at American Nuclear Society Topical Meeting on Artificial Intelligence and Other Innovative Computer Applications in the Nuclear Industry, Aug. 31, 1997–Sep. 2, 1987.

"Lockheed Idaho Technologies Company Invention Disclosure Record," by A.D. Watkins, C.P. Cannons and A.M. Porter, 6 pages (Date of disclosure unknown).

Development of a Smart Temperature Measurement System Based on the Multi–Lead Thermocouple Concept, by Natour, Majed Nasr, published May 1990.

*Primary Examiner*—George M. Dombroske
*Assistant Examiner*—Paul D. Amrozowicz
*Attorney, Agent, or Firm*—Fish & Richardson, P.C., P.A.

[57] ABSTRACT

A self-verifying temperature sensor and method for measuring and verifying the true thermodynamic temperature of a system. The sensor is constructed of various combinations of the following temperature-dependent elements: thermoelements, resistive elements, capacitive elements and other inductive elements. In the preferred embodiment, the sensor is constructed of resistive element connected between four thermoelement wires. A fifth thermoelement wire is connected to the resistive element. The sensor produces a data signature from various voltage, resistance, inductance, and capacitance measurements. Measurement electronics collect and condition the data signature. A computer analyzes the data signature and provides the system operator with a verified sensor temperature, thus, allowing the system operator to recognize and account for drift or decalibration of the sensor. The self-verifying temperature sensor can also be recalibrated insitu, thereby eliminating the necessity of sensor removal to verify recalibration.

8 Claims, 2 Drawing Sheets

U.S. PATENT DOCUMENTS

| | | | |
|---|---|---|---|
| 5,069,553 | 12/1991 | Phillippi | 374/140 |
| 5,073,758 | 12/1991 | Postlewait et al. | 324/713 |
| 5,089,749 | 2/1992 | Cadogan | 315/151 |
| 5,112,137 | 5/1992 | Wickersheim et al. | 374/131 |
| 5,116,137 | 5/1992 | Xiong et al. | 374/132 |
| 5,121,994 | 6/1992 | Molitoris | 374/179 |
| 5,176,451 | 1/1993 | Sasada et al. | 374/179 |
| 5,183,338 | 2/1993 | Wickersheim et al. | 374/131 |
| 5,209,571 | 5/1993 | Kendall | 374/139 |
| 5,232,286 | 8/1993 | Dubreuil et al. | 374/139 |
| 5,246,293 | 9/1993 | Luotsinen et al. | 374/181 |
| 5,275,327 | 1/1994 | Watkins et al. | 228/102 |
| 5,277,496 | 1/1994 | Mayer et al. | 374/130 |
| 5,351,551 | 10/1994 | Drubetsky et al. | 73/755 |
| 5,356,220 | 10/1994 | Iida et al. | 374/161 |
| 5,366,290 | 11/1994 | Mayer et al. | 374/130 |
| 5,377,126 | 12/1994 | Flik et al. | 364/557 |

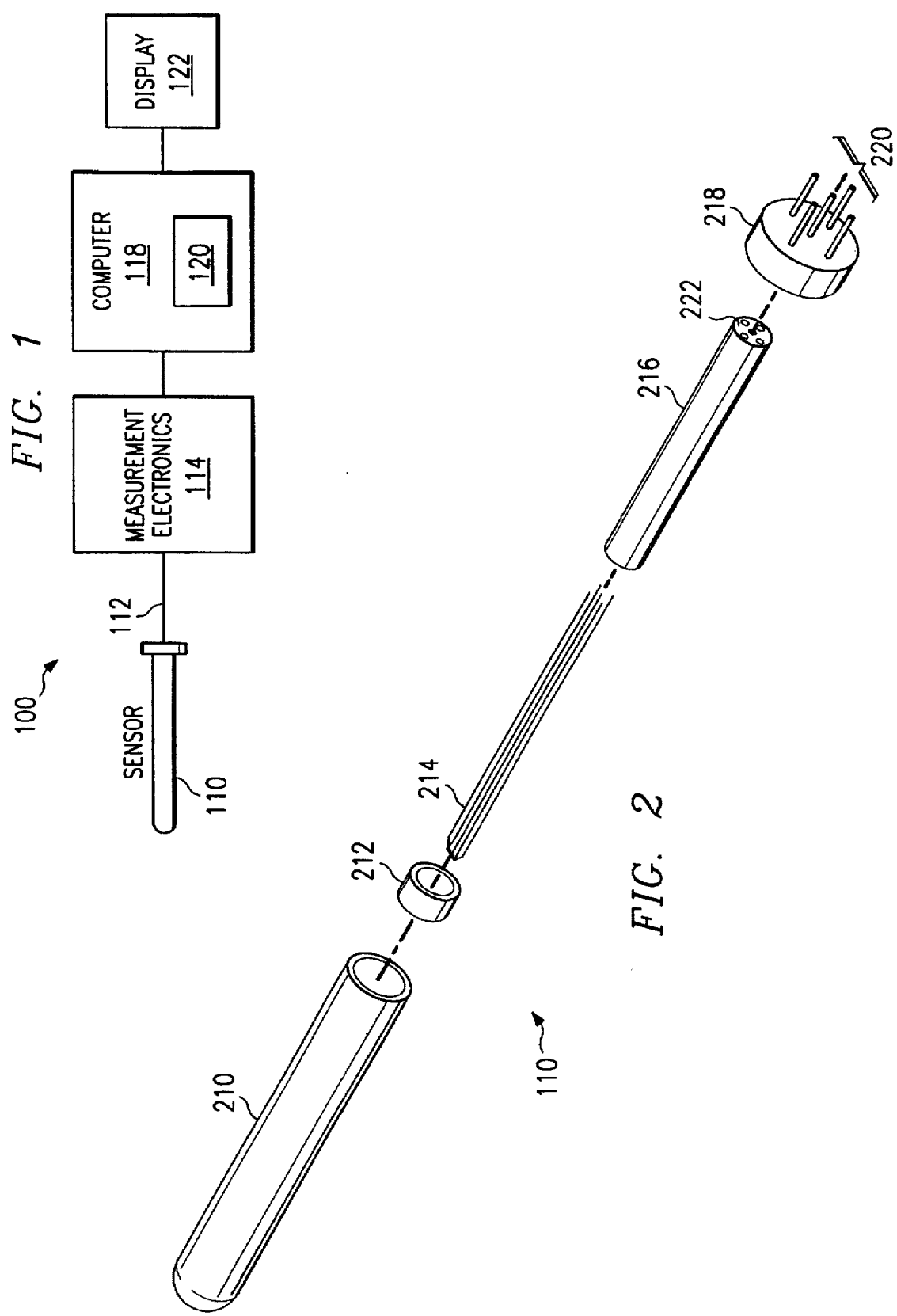

SELF-VERIFYING TEMPERATURE SENSOR

TECHNICAL FIELD OF THE INVENTION

This invention generally relates to a device and method for measuring a thermodynamic temperature of a system and more particularly to a self-verifying device for measuring a system's true thermodynamic temperature.

BACKGROUND OF THE INVENTION

The accurate measurement of temperature has become very important to many modern industrial processes. The typical industrial temperature control system relies on signal outputs generated by some sort of temperature sensing device to provide a temperature reading for a given system. The temperature reading is utilized to regulate energy input, material input, the quantity and quality of the product being produced, environmental and safety parameters, and other parameters that are critical to the manufacturing process being conducted. Set points that operate modern processing, manufacturing, and energy generating facilities often reference measured temperature. As such, the ability to accurately measure and verify a system's temperature is critical to optimize the efficiency and safety of any temperature-dependent process. However, as a basic physical quantity, like pressure, mass and time, temperature is extremely difficult to measure accurately and great difficulties arise in determining if a temperature reading being provided by a given sensor represents the true, thermodynamic temperature. The prior art lacks any teaching of a temperature measuring device which can provide a verifiably accurate reading of temperature over a given temperature range.

A second problem associated with the various temperature measuring devices of the prior art is that all known prior art devices require periodic recalibration in a calibration oven or similar device after a period of use. Such calibration necessitates the removal of the device from the system in which it is being utilized during the period of recalibration. Removal of the temperature measuring device from the system gives rise to safety and environmental risks while the downtime associated with calibration represents a significant cost in lost productivity.

As temperature can be measured in a variety of ways via a diverse array of sensors, various methods of temperature measurement utilizing a variety of generally well understood concepts and sensors exist. The various methods of measuring temperature can be broken down into several distinct categories or families of devices, each of which is based on and utilizes different scientific principles. The various families of devices include resistance thermometry devices (RTDs and thermistors), thermocouples, optical pyrometry devices such as black body emission devices and infrared radiators, bimetallic devices, liquid expansion devices, and change of state devices. The fundamental link between these distinct families of sensors is that each family infers temperature by exhibiting some change in a physical characteristic in response to a change in temperature. RTDs measure the change in the sensor's electrical resistance as its temperature changes, with the resistance rising in an approximately linear fashion with temperature. Thermistors, which are generally constructed of various ceramic semiconductor materials, exhibit a nonlinear drop in resistance with a rise in temperature. Thermocouples measure the electromotive force (EMF) between a pair of dissimilar wires. Optical devices, such as infrared sensors, infer a temperature by measuring the thermal radiation emitted by a material. Other optical devices utilize photoluminescent principles to determine temperature. Bimetallic devices measure the difference in the rate of thermal expansion between different metals. Liquid expansion devices, such as a typical household thermometer, simply measure the volume change of a given fluid in response to a change in temperature. Finally, change-of-state temperature sensors change appearance once a certain temperature is reached. Of the foregoing temperature sensors, the vast majority of devices used in industry today utilize resistance thermometry devices, thermocouple devices, or optical devices.

The prior art contains numerous examples of resistance thermometry devices. U.S. Pat. No. 4,971,452 issued to Finney on Nov. 20, 1990, teaches an RTD for measuring the temperature of the heat receiving surface of a heat exchanger. The RTD includes an RTD assembly which is welded directly to the heat receiving surface of the heat exchanger and which shields the resistance element from combustion gases and thermally isolates the resistance element from the sheath of a sheathed cable which electrically connects the RTD to its associated circuitry. U.S. Pat. No. 5,073,758 issued to Postlewait et al. on Dec. 17, 1991, shows a circuit and method for measuring resistance in an active and high temperature environment.

The prior art also contains numerous examples of thermocouples and thermoelements. U.S. Pat. No. 5,209,571 issued to Kendall on May 11, 1993, teaches a device for measuring the temperature of molten metal. The device includes a thermocouple element, a housing consisting of a heat resistant material, and a retainer member for receiving the heat resistant element. U.S. Pat. No. 5,232,286 issued to Dubreuil et al. on Aug. 3, 1993, shows a thermocouple for high temperature measurements of liquid metals, mattes and slags. The thermocouple comprises two cermet elements of dissimilar metals in which the thermoelectric circuit is closed by the medium, the temperature of which is being measured. U.S. Pat. No. 5,121,994 issued to Molitoris on Jun. 16, 1992, shows a thermocouple probe for use in an autoclave.

The prior art also contains examples of temperature measurement devices which utilize a pair of thermocouples. As an example, U.S. Pat. No. 5,038,303 issued to Kimura on Aug. 6, 1991, teaches a method and apparatus of measuring temperature using a main thermocouple and an auxiliary thermocouple connected to one leg of the main thermocouple to provide cold junction compensation. U.S. Pat. No. 5,061,083 issued to Grimm et al. on Oct. 29, 1991, teaches a temperature monitoring device composed of at least a first thermocouple and a second thermocouple.

Each of the aforementioned prior art devices utilizes an RTD or a thermocouple or, in certain instances, a pair of thermocouples; however, the prior art contains no teaching of combining an RTD with a thermocouple. Furthermore, the prior art contains no teaching of combining any other type of impedance element (capacitors, inductors, crystals, or semiconductors) with one or more thermocouples. Finally, the prior art contains no teaching of combining two or more thermoelement wires with any type of impedance element.

The prior also teaches combining two optical temperature measuring devices. U.S. Pat. No. 5,112,137 issued to Wickersheim et al. on May 12, 1992, teaches an apparatus and method for measuring high temperature ranges using black body techniques and lower temperature ranges utilizing photoluminescent techniques, both of which are optical temperature measuring techniques. Wickersheim does not teach combining two sensors from different families of sensors such as a resistance device and a thermocouple or a resistance device and an optical device or similar combinations.

A further fundamental limitation with the temperature sensing devices of the prior art is that these devices are incapable of providing a reliable check of calibration over the temperature operating range without removal of the sensor for comparison with a known calibration reference. The fundamental limitation of all of the prior art devices is that they utilize a single family of temperature measurement devices, i.e., RTDs, thermoelements, optical devices, etc. to measure temperature. Although certain prior art devices exist which use more than one temperature measurement device, such as a pair of thermocouples or a pair of optical devices, the prior art contains no teaching of combining two dissimilar devices such as a resistive or capacitive element with one or more thermoelements.

Generally, the primary failure mode or modes for one family of measurement devices is distinct from the primary failure mode for another type of measurement method. Further, the primary failure modes for different types of devices within the same family will generally differ. A sensor element has a tendency to degrade or decalibrate due to hostile service conditions or due to an extended period of use without recalibration along a primary failure mode. If this occurs, the output signal from the sensor will no longer accurately correlate with the true, thermodynamic temperature at the point of the sensor. The prior art lacks any teaching of a device which can alert the operator to drift in the output of the sensor occurring from degradation due to any of a variety of factors while continuing to provide a true thermodynamic system temperature. U.S. Pat. No. 5,176,451 issued to Sasada et al. teaches a temperature sensor utilizing a thermocouple which includes means for indicating when a short circuit occurs in the thermocouple. A critical shortcoming of Sasada is that the operator only receives an indication when a complete sensor shutdown or short circuit has occurred. The operator receives no indication or warning when the sensor begins to decalibrate or drift and thereby is no longer reading the true, thermodynamic temperature but instead is providing an erroneous system temperature.

In the event of sensor decalibration or failure, an operator is forced to utilize other sources of information to correct for the failure, decalibration, or "drift" of the sensor. When the level of decalibration or "drift" in the sensor reaches the point where it is suspected as being unacceptable, the sensor must be recalibrated or replaced. Moreover, the prior art lacks any device or method to allow the operator to determine the amount of drift. Presently, an operator is forced to "guess," based on experience, as to the level of decalibration. In summary, the only known reliable method of verifying the accuracy of modern temperature sensors over a wide temperature range is removal and independent recalibration in a calibration furnace. For many modern applications this procedure requires costly and unacceptable shutdowns and maintenance expense. System shutdowns to accomplish the calibration function also involve significant safety risks to the individuals associated with the removal of the sensor from the system. For example, in many applications where the system must continue to operate, the removal of the sensor element is dangerous, if not impossible.

There is a need in the art for a temperature measuring device and method which can provide a true verified thermodynamic temperature.

There is a further need for a device which can be recalibrated insitu, thereby obviating the need to remove the sensor from the system for calibration.

There is a further need for a device which incorporates two or more distinct families of temperature sensors, thereby greatly reducing the likelihood that each of the sensors in a given device will decalibrate in response to the same hostile service conditions or at approximately the same point in their operational lives.

There is a further need for a device which produces a data signature comprising a variety of voltage and impedance measurements obtained from the sensor.

There is a further need for a method of compiling a data signature comprising a variety of voltage and impedance measurements and analyzing the data signature to determine a verified true system temperature.

SUMMARY OF THE INVENTION

The above and other needs are met by a device and method for measuring and verifying a system's true thermodynamic temperature. A self-verifying temperature sensor includes a sensor, measurement electronics, and a computer.

Within the sensor is a multiwire sensor element. In various embodiments, the sensor element contains a plurality of temperature-dependent thermoelements coupled to at least one temperature-dependent impedance device. In a preferred embodiment, the multiwire sensor has two thermocouples, with each thermocouple formed from two different thermoelements. Junction points of the thermocouples are coupled on either side of a resistance device. A fifth thermoelement is coupled to the center of the resistance device.

The thermoelements are coupled to measurement electronics. The measurement electronics inject signals into the thermoelements and collect a data signature therefrom. One thermocouple is chosen as the primary temperature sensor and is continuously monitored. The other thermoelements form a secondary sensor and are monitored in various combinations.

The data signature is filtered, amplified, and converted into digital data. The digital data is sent to a computer for conversion to temperature values and further analysis. The computer displays the temperature determined from the primary sensor on a display. The computer uses the data collected from the secondary sensor to verify the temperature measured by the primary sensor. Since the secondary sensor data is obtained from a plurality of temperature-dependent elements, each element having a different failure mode, the data indicates when one or more parts of the sensor has degraded. From this verification, the computer calculates a confidence level of the primary sensor. This confidence level is also displayed on the computer terminal display.

A technical advantage of the present invention is that it overcomes the deficiencies of the prior art by providing a self-verifying temperature sensor which utilizes at least two temperature measuring devices from different families of sensors and obtains a data signature therefrom which can be analyzed to determine a verified system temperature.

A further technical advantage of the present invention is that the device can be recalibrated insitu, thereby eliminating the necessity of removing the sensor from the system in which temperature is being measured.

A further technical advantage of the present invention is that the temperature sensor produces a data signature which may include a primary data package and one or more backup data packages which can be compared against the primary data package to verify the system temperature.

A further technical advantage of the present invention is it can measure and indicate the degree of degradation which has occurred in the sensor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a high-level block diagram of the self-verifying temperature sensor of the present invention;

FIG. 2 shows an exploded view of a sensor of the present invention;

DESCRIPTION OF THE PREFERRED EMBODIMENTS

Figure 3:
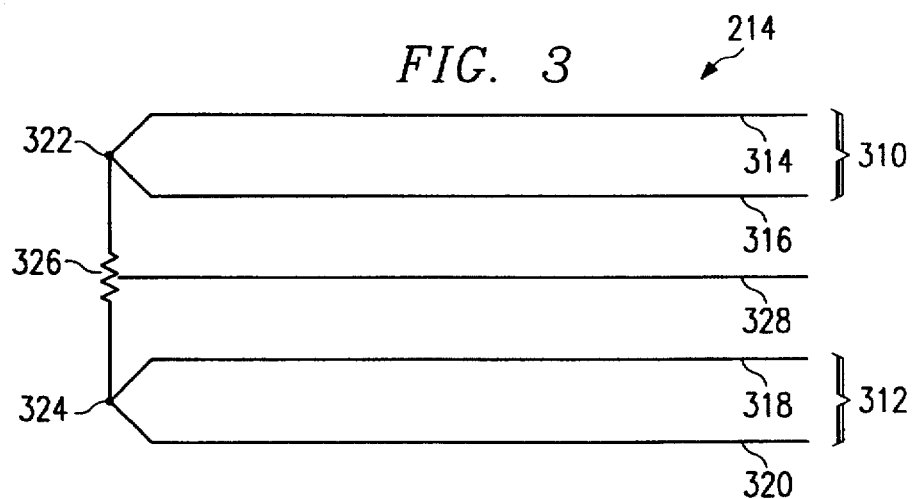
FIG. 3 shows a more detailed view of a preferred embodiment of a sensor element of the present invention.

In describing the present invention, the term "system" denotes any thermodynamic body for which it is desired to obtain a verified true temperature. For example, the present invention may be utilized to obtain a verified true system temperature for any industrial process requiring the accurate measurement of temperature, such as those found in the metal, ceramic, glass, power generation and petrochemical industries. Further, the present invention may be utilized to provide a verified true system temperature for any type of engine or power generation source presently utilized. It is to be understood that the present invention may be utilized to measure temperature over all temperature ranges from the cryogenic region to extremely high temperatures.

The term "impedance element," as used herein, shall mean any type of impedance based thermometry device, including resistance thermometry devices, inductance thermometry devices, capacitance thermometry devices, semiconductor devices, and crystal devices.

The term "temperature-dependent element," as used herein, shall mean any type of sensor element which exhibits a characteristic and measurable change in one or more physical properties in response to a change in temperature. Such sensor elements may include: (1) any device exhibiting a characteristic change in voltage or impedance in response to a temperature change, including impedance elements; and (2) thermoelements and thermocouples. Since the changes in response to temperature for each of these devices are well understood, a temperature of a device can be determined by examining its characteristics.

Referring now to the drawings and in particular to FIG. 1, a functional block diagram of self-verifying temperature sensor ("SVTS") 100 is shown. SVTS 100 includes sensor 110 coupled via connecting cable 112 to measurement electronics 114. Measurement electronics 114 are coupled via an interconnect to computer 118. Computer 118 executes software 120 and outputs data on display 122 indicating a thermodynamic temperature of the system measured by sensor 110 and a confidence level.

A preferred embodiment of sensor 110 is illustrated in FIG. 2. Sensor 110 comprises protection tube (PT) 210. Within PT 210 are spacer 212, multiwire sensor 214, thermoelement insulator 216, and electrical connector 218.

PT 210 can be manufactured of any material capable of withstanding the demands of the system in which sensor 110 is installed. A preferred embodiment of PT 210 is made from stainless steel, although PT 210 could also be any refractory material.

Ceramic spacer 212 fits within PT 210 and holds multiwire sensor 214 in the proper position. The primary purpose of spacer 212 is to insulate multiwire sensor 214 from other conductive elements in PT 210. Accordingly, spacer 212 can be made from any dielectric material. In addition, an important function of PT 210 and spacer 212 is to maintain multiwire sensor 214 in an isothermal condition.

FIG. 3 shows a more detailed illustration of a preferred embodiment of multiwire sensor 214. Sensor 214 includes two distinct thermocouples 310, 312, each comprised of two thermoelements 314,316,318,320. Thermoelements 314 and 316 are joined at junction 324. Likewise, thermoelements 318 and 320 are joined at junction 322. The junctions 322 and 324 are coupled to opposite sides of temperature-dependent element 326. Another thermoelement 328 extends from the center of temperature-dependent element 326.

Each thermoelement of each thermocouple is manufactured of a different temperature-dependent material. For example, thermoelement 314 is manufactured from a different material than thermoelement 316. Moreover, in the preferred embodiment, the thermocouples 310, 312 are manufactured from the same materials. That is, thermoelements 314 and 318, like thermoelements 316 and 320, are manufactured from the same material.

The thermoelements 314,316,318,320,328 are wires which will vary in length and diameter depending on system parameters. In the preferred embodiment, thermoelements 314 and 318 are manufactured of CHROMEL™. Thermoelements 316 and 320 are preferably manufactured of ALUMEL™. CHROMEL™ and ALUMEL™ are trademarks of Hoskins Manufacturing Company, 10776 Hall Road, P.O. Box 218, Hamburg, MI. 48139-0218. Thermoelement 328 can be manufactured of any suitable material, and need not be of the same material as the other thermoelements 314,316,318,320. Of course, the thermoelements 314,316,318,320,328 can be manufactured of other materials. Thermoelements made from materials such as platinum/rhodium, tungsten/rhenium, copper, iron, and constantan are well known in the art and may be substituted.

In a preferred embodiment, temperature-dependent element 326 is a resistive element. However, any impedance element having well-known failure modes can be substituted. Thus, temperature-dependent element 326 could be, for example, an inductor, capacitor, diode, semiconductor device, or a crystal device.

Moreover, it is very important to note that FIG. 3 only discloses one embodiment of multiwire sensor 214. Possible alternative embodiments include multiwire sensors having one or more temperature-dependent elements within any of the thermoelement wires 314,316,318,320,328 or without impedance element 326. In the embodiment in which multiwire sensor 214 is constructed without temperature-dependent element 326, thermocouples 310 and 312 are joined at junctions 322 and 324 which form a common junction point and thermoelement wire 328 may also optionally be joined to junctions 322 and 324. In addition, multiwire sensor 214 could have a different number of thermoelement wires than those shown in FIG. 3. Such alternative embodiments are readily apparent and clearly within the scope of the present invention.

In operation, each individual thermoelement 314,316,318, 320,328 generates an electromotive force (EMF) which correlates in a consistent manner with temperature over a usable temperature range. Impedance and/or voltage is measured by injecting a known current into a first pair of thermoelements and measuring the voltage generated across a second pair. Each pair can be selected from any two thermoelements 314,316,318,320,328 not in the other pair. The measurements are taken in both the "forward" and "reverse" directions and the resulting measurements averaged to compensate for the voltage and/or impedance generated by the thermoelements 314,316,318,320,328. Since the electrical characteristics of the thermoelements 314,316, 318,320,328 and temperature-dependent element 326 at particular temperatures are well known, the temperature of the system can be determined from the electrical signals measured from multiwire sensor 214.

To measure temperature, one combination of thermoelements is chosen to be a primary sensor while the remaining thermoelements form a secondary sensor. For example, thermocouple 310 can be selected as the primary sensor while measurements taken from the other thermoelements 318,320,328 (and different combinations of thermoelements 314 and 316) form the secondary sensor. The further details of the temperature measuring and verifying process are described below.

Returning to FIG. 2, thermoelement insulator 216 is also shown. In the preferred embodiment, the thermoelement insulator is manufactured from ceramic or another dielectric material. Thermoelement insulator 216 contains five holes 222, each hole forming a receptacle for a thermoelement 314,316,318,320,328. Each hole has a diameter as required to meet the ratio between the thermoelement and the inside diameter of the sensor.

Finally, electrical connector 218 is connected to thermoelement insulator 216 such that its conductive prongs 220 are in electrical communication with each thermoelement 314,316,318,320,328. Electrical connector 218 connects with connecting cable 112 to transfer electrical signals from sensor 110 to measurement electronics 114.

Measurement electronics 114 is coupled to connecting cable 112 and collects and conditions a data signature produced by the sensor 110. The data signature is comprised of electrical signals received from sensor 110. Measurement electronics 114 monitors sensor 110 using lead to lead measurements of impedance and voltage measured across various combinations of leads using AC and/or DC techniques. Such techniques are well known to one of ordinary skill in the art. These measurements are then correlated and analyzed to extract the necessary data for temperature and sensor condition. In an alternative embodiment, measurement electronics 114 may be coupled to multiple sensors 110. Such a configuration would require modifications readily apparent to one of ordinary skill in the art.

Figure 4:
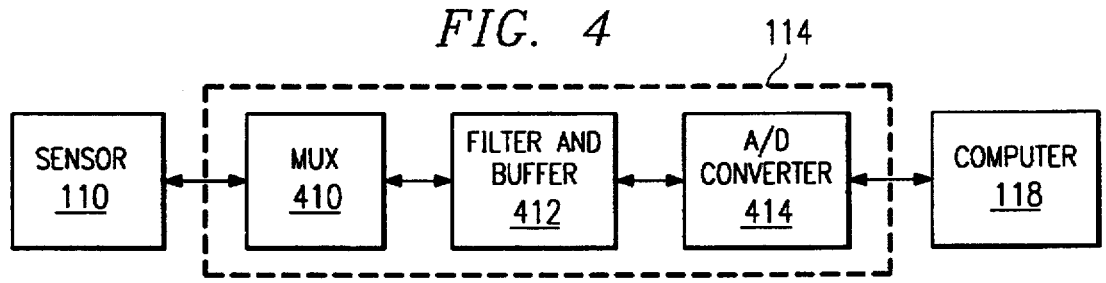
FIG. 4 shows a functional block diagram of the measurement electronics.

FIG. 4 is a functional block diagram showing measurement electronics 114 and related components. Within measurement electronics 114 are multiplexer (MUX) 410, filter and buffer 412, and analog to digital (A/D) converter 414.

MUX 410 operates under control of computer 118 to select particular signals from the thermoelements and passes those signals to filter and buffer 412. MUX 410 also allows the injection of a known current into sensor 110 for impedance measurement. In addition, MUX 410 allows selection of forward or reverse reading of sensor 110.

Filter and buffer 412 receives selected signals from MUX 410. The filter performs antialiasing to improve the noise performance of A/D converter 414. A buffer amplifier provides a high input impedance to reduce the effect of the resistance of the MUX 410 switches.

A/D converter 414 is a high resolution Sigma-Delta A/D converter. A/D converter 414 converts the data signature received from sensor 110 into one or more digital values representing the data signature. These digital values are then passed to computer 118 for further processing.

A preferred embodiment of A/D converter 414 is comprised of primary and secondary A/D converters. Signals from the primary sensor element bypass MUX 410 and filter and buffer 412 and, instead, are passed directly from sensor 110 to the primary A/D converter. The primary A/D converter continuously reads these signals. The secondary A/D converter is connected to sensor 110 via MUX 410 and can read the primary sensing elements or any other sensing elements in any combination. In addition, a temperature sensor can be connected to the secondary A/D converter to allow cold junction calculations to be made.

Computer 118 receives the digital signal output by A/D converter 414. Computer 118 is preferably a standard microcomputer comprising a central processing unit (CPU), random access memory (RAM), and display 122. The present invention, however, is not restricted by the architecture of computer 118. As is well understood by those of ordinary skill in the art, computer 118 executes software 120 stored in RAM on CPU to performed desired functions. In addition, one of skill in the art will understand that measurement electronics 114 could be integrated with computer 118.

Figure 5:
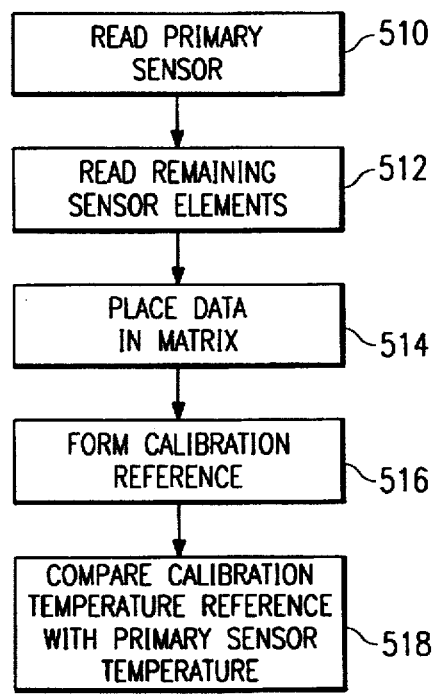
FIG. 5 illustrates the steps performed by a computer system adapted to execute the present invention.

FIG. 5 is a flow chart illustrating the primary steps performed by computer 118. At step 510, computer 118 reads the primary sensor. The digital signal is converted from an impedance value into a primary temperature value. This primary temperature value is displayed on display 122.

At step 512, computer 118 reads the remaining sensor elements. The data signature is analyzed to compute all impedances in the thermoelements 314,316,318,320,328 as well as in temperature-dependent element 326. The digital signal is converted from impedance values into temperature values. Data that is outside of predetermined limits is discarded. In various alternative embodiments, computer 118 may read data from both the primary sensor and the remaining sensor elements either by periodic sampling of the sensor elements or by continuous monitoring of the sensor elements. Computer 118 may also read data from several sensors at the same time or from each sensor sequentially, depending on specific system requirements.

At step 514, the data is placed in a data matrix. The data is categorized as to which sensor element generated each datum. Then, each datum is placed in the matrix at a location determined by the category in which the datum resides.

At step 516, a calibration reference is formed from the sensor data in the data matrix. The calibration reference is a single temperature value used to verify the integrity of the primary sensor. The calibration reference must include data from at least three different sensors, and generated from at least two physically distinct temperature-dependent elements. The calibration reference must be formed in this manner because a failure mode that might adversely affect, or deteriorate, one type of sensing element should not have a similar effect on a separate sensor type. For example, impedance devices and thermoelement devices are, in general, degraded by different mechanisms and at different rates in response to hostile service conditions. Therefore, the calibration reference can detect and account for failing parts of sensor 110.

At step 518, computer 118 compares the calibration reference temperature with the primary sensor temperature. Then, computer 118 determines the level of agreement of the temperatures. This level of agreement represents a confidence level that the sensor is operating correctly. The confidence level is displayed on display 122. Data from both the primary sensor and the remaining sensor elements may also be stored in the data matrix and subsequently compared to more recently acquired data to allow monitoring of sensor aging and integrity, as well as alarm conditions.

As previously discussed, the primary sensor and the remaining sensor elements must be maintained in an isothermal condition. Maintaining an isothermal condition is necessary to allow calibration of the primary sensor against the remaining sensor elements. More specifically, and referring to FIG. 3, it is critical that temperature-dependent element 326 and junctions 322 and 324 are maintained in an isothermal condition by PT 210. One of skill in the art would appreciate that thermocouples 310 and 312, while contained within PT 210, may experience a temperature gradient over the length of the thermocouples.

It is to be further understood that an alternative embodiment of the present invention may encompass temperature-dependent element 326 being maintained in an isothermal relationship with junctions 322 and 324, but not being physically connected to thermocouples 310 and 312 at junctions 322 and 324. As long as temperature-dependent element 326 is thermally coupled to thermocouples 310 and 312 by PT 210 and spacer 212, such an embodiment could provide the necessary data to generate a primary sensor temperature and a calibration reference.

In the event that sensor 110 has failed, that is, the confidence level is below a predetermined limit, sensor 110 can be "rearranged." That is, the primary sensor selection and data matrix can be changed to measure temperature from different parts of sensor 110. Accordingly, this option restores SVTS 100 to full operation and again provides a verified temperature output. The rearranging step allows for what is, in effect, a recalibration of the sensor insitu. If sensor 110 degrades to the point where it cannot obtain a verified temperature, SVTS 100 will notify the operator accordingly.

Although the present invention and its advantages have been described in detail, it should be understood that various changes, substitutions and alterations can be made herein without departing from the spirit and scope of the invention as defined by the appended claims.

What is claimed is:

1. A self-verifying temperature sensor, comprising:
  a temperature-dependent element having a first end and a second end;
  a first thermocouple coupled to the first end;
  a second thermocouple coupled to the second end; and
  a thermoelement coupled to the temperature-dependent element between the first and second ends.

2. The sensor of claim 1, further comprising:
  a protection tube surrounding the temperature-dependent element, the first and second thermocouples, and the thermoelement; and
  a spacer element within the protection tube and holding the temperature-dependent element, the first and second thermocouples, and the thermoelement in a fixed position.

3. The sensor of claim 1, wherein the temperature-dependent element is an impedance device.

4. The sensor of claim 3, wherein the impedance device is selected from the group consisting of: a resistor, a capacitor, an inductor, a diode, a crystal, and a semiconductor.

5. The sensor of claim 1, wherein the first and second thermocouples each comprise:
  a first thermoelement made from a first temperature-dependent material; and
  a second thermoelement made from a second temperature-dependent material, wherein the second temperature-dependent material is different than the first temperature-dependent material.

6. The sensor of claim 5, wherein the first thermoelement is made from a nickel-chromium alloy.

7. The sensor of claim 5, wherein the second thermoelement is made from a nickel alloy.

8. The sensor of claim 5, wherein the first and second thermoelements are joined at a junction point and the junction point is coupled to the temperature-dependent element.

* * * * *